US012803280B2

(12) United States Patent
Hayashibara et al.

(10) Patent No.: US 12,803,280 B2
(45) Date of Patent: Nov. 17, 2026

(54) ELECTRONIC DEVICE

(71) Applicant: Sony Interactive Entertainment Inc., Tokyo (JP)

(72) Inventors: Masanori Hayashibara, Tokyo (JP); Shinya Hiromitsu, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 590 days.

(21) Appl. No.: 17/627,772

(22) PCT Filed: Jul. 28, 2020

(86) PCT No.: PCT/JP2020/028889
§ 371 (c)(1),
(2) Date: Jan. 17, 2022

(87) PCT Pub. No.: WO2021/020391
PCT Pub. Date: Feb. 4, 2021

(65) Prior Publication Data
US 2022/0329071 A1 Oct. 13, 2022

(30) Foreign Application Priority Data
Jul. 30, 2019 (JP) ................................ 2019-140247

(51) Int. Cl.
*H02J 3/0012* (2026.01)

(52) U.S. Cl.
CPC ......... *H02J 3/0012* (2020.01); *H02J 2310/12* (2020.01)

(58) Field of Classification Search
CPC ...... H02J 3/0012; H02J 2310/12; H02J 1/002; H02J 1/082; H02J 9/061; G06F 1/30;
(Continued)

(56) References Cited

U.S. PATENT DOCUMENTS

2003/0214825 A1* 11/2003 Lee ........................ H02M 7/12 363/84
2007/0245179 A1* 10/2007 Noda .............. G01R 31/31716 714/718

(Continued)

FOREIGN PATENT DOCUMENTS

EP 2003532 A2 12/2008
JP 56116888 A 9/1981

(Continued)

OTHER PUBLICATIONS

Extended European Search Report for corresponding EP Application No. 20846553.4, 7 pages, dated Aug. 2, 2023.

(Continued)

*Primary Examiner* — Catherine T. Rastovski
*Assistant Examiner* — Lal Ce Mang
(74) *Attorney, Agent, or Firm* — Kilpatrick Townsend & Stockton LLP

(57) ABSTRACT

An electronic device includes a power supply unit and a main body unit. The power supply unit converts electric power supplied from an external power supply to a DC voltage of a first voltage value to output the voltage to the main body unit and changes, in a case where power supply from the external power supply has been cut off, a value of the DC voltage that it outputs to a second voltage value that is different from the first voltage value. The main body unit executes predetermined termination processing in a case where the value of the DC voltage output by the power supply unit has changed to the second voltage value.

6 Claims, 2 Drawing Sheets

(58) Field of Classification Search
CPC .......... H02M 1/007; H02M 1/32; H02M 7/12; H02M 7/02
See application file for complete search history.

(56) References Cited

U.S. PATENT DOCUMENTS

| | | | | |
|---|---|---|---|---|
| 2008/0284389 | A1* | 11/2008 | Kawase | G06F 1/24 323/266 |
| 2018/0351343 | A1* | 12/2018 | Frosterød | H02H 7/1252 |
| 2019/0079437 | A1* | 3/2019 | Motoyama | G03G 15/04072 |

FOREIGN PATENT DOCUMENTS

| | | | | | |
|---|---|---|---|---|---|
| JP | 56116888 | U | | 9/1981 | |
| JP | 6032566 | A | | 2/1985 | |
| JP | 62202083 | A | | 9/1987 | |
| JP | 62202083 | U | | 12/1987 | |
| JP | 02228256 | A | * | 9/1990 | H02M 3/00 |
| JP | H02228256 | A | * | 9/1990 | H02M 3/00 |
| JP | 11041806 | A | | 2/1999 | |
| JP | 2009153351 | A | | 7/2009 | |
| JP | 2018153044 | A | * | 9/2018 | A63F 7/02 |

OTHER PUBLICATIONS

Decision to Grant a Patent for corresponding JP Application No. 2021-535357, 4 pages, dated Sep. 16, 2022.
International Search Report for corresponding PCT Application No. PCT/JP2020/028889, 6 pages, dated Sep. 1, 2020.

* cited by examiner

ELECTRONIC DEVICE

TECHNICAL FIELD

The present invention relates to an electronic device that operates by electric power supplied from an external alternating current (AC) source.

BACKGROUND ART

There is known an electronic device that operates by electric power supplied from an AC source such as a household commercial power supply. Normally, in operating such an electronic device, an external or built-in power supply unit converts the electric power supplied from the AC source into direct current (DC) power and supplies the electric power converted into the DC power to a main body unit of the electronic device.

SUMMARY

Technical Problem

Power supply from an external AC source to a power supply unit could unexpectedly stop due to a power failure or the like. In such a case, power supply from the power supply unit to a main body unit of an electronic device would eventually be cut off, making it difficult for the main body unit to continue operating. Yet, there are cases where termination processing of the main body unit, for example, is expected to be performed with use of the electric power accumulated in the power supply unit, before the power supply to the main body unit is completely cut off. In order to achieve this, the power supply unit needs to detect that power supply has been cut off and notify the main body unit of occurrence of such an event. However, reception of a notification from the power supply unit requires a control signal line for transmission of such a notification.

The present invention has been made by taking into consideration the abovementioned circumstances, and has, as an object thereof, provision of an electronic device that is capable of executing, in a case where power supply from an outside has been cut off, processing according to cutoff of power supply without use of a control signal line.

Solution to Problem

An electronic device according to one mode of the present invention is an electronic device including a power supply unit and a main body unit, in which the power supply unit includes an output section that converts electric power supplied from an external power supply to a DC voltage of a first voltage value and outputs the voltage to the main body unit and a control section that changes, in a case where power supply from the external power supply has been cut off, a value of the DC voltage to be output by the output section to a second voltage value that is different from the first voltage value, and the main body unit executes predetermined termination processing in a case where the value of the DC voltage output by the power supply unit has changed to the second voltage value.

A power supply unit according to one mode of the present invention is a power supply unit that supplies electric power to a main body unit of an electronic device, the power supply unit including an output section that converts electric power supplied from an external power supply to a DC voltage of a first voltage value and outputs the voltage to the main body unit of the electronic device and a control section that changes, in a case where power supply from the external power supply has been cut off, a value of the DC voltage to be output by the output section to a second voltage value that is different from the first voltage value.

DESCRIPTION OF EMBODIMENT

An embodiment of the present invention is described in detail below on the basis of the drawings.

Figure 1:
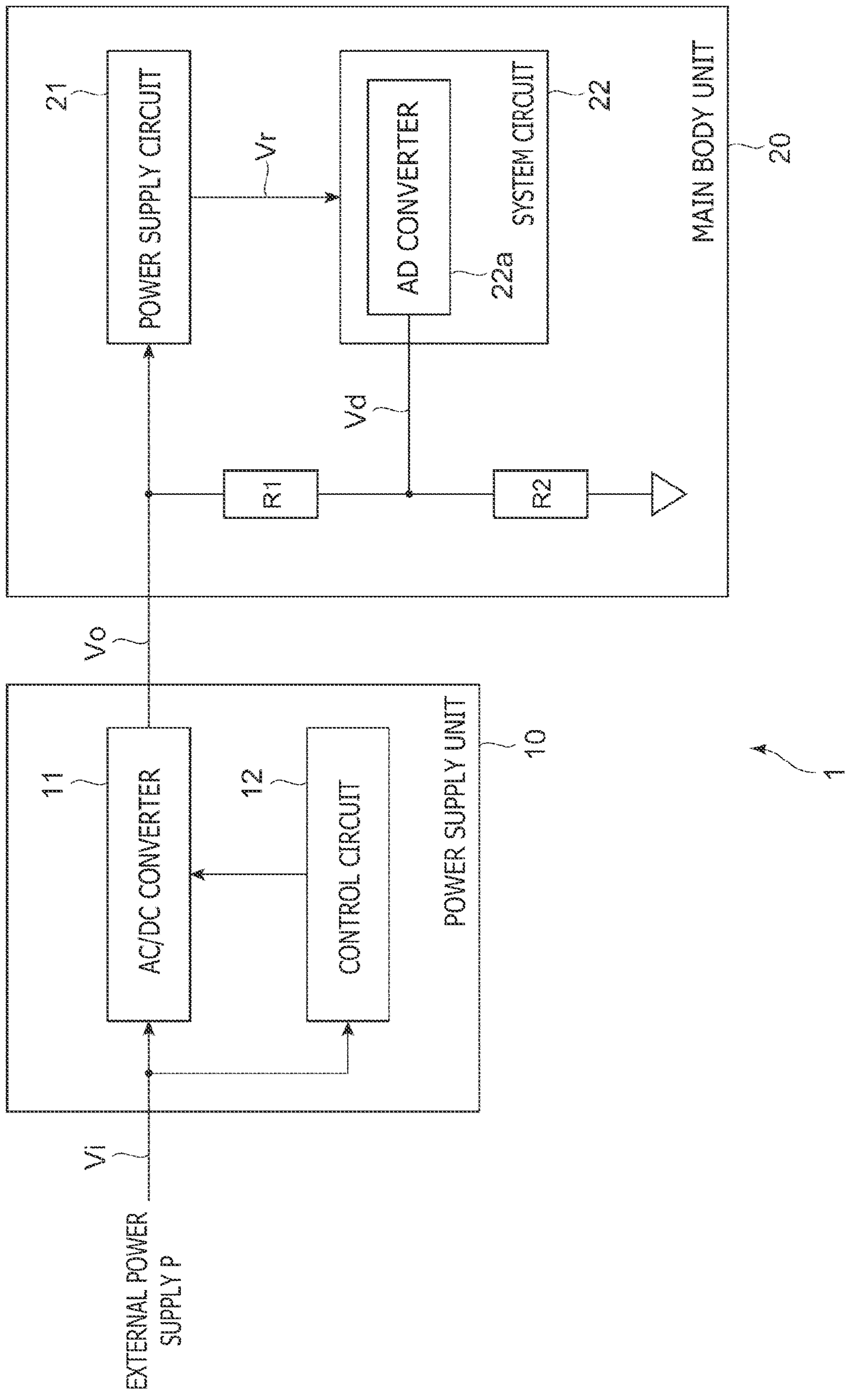
FIG. 1 is a configuration block diagram illustrating a configuration of an electronic device according to an embodiment of the present invention.

FIG. 1 is a configuration block diagram illustrating a schematic configuration of an electronic device 1 according to an embodiment of the present invention. The electronic device 1 is, for example, a personal computer or a home game console, and includes a power supply unit 10 and a main body unit 20. In addition, the electronic device 1 is connected to an external power supply P via a power supply cable 30. In the present embodiment, the external power supply P is an AC source such as a household commercial power supply.

The power supply unit 10 includes an AC/DC converter 11 and a control circuit 12.

The AC/DC converter 11 converts AC power that is input from the external power supply P via the power supply cable 30 to a DC voltage of a predetermined voltage value, and outputs the voltage to the main body unit 20. In the following description, an AC voltage input to the AC/DC converter 11 from the external power supply P is described as an input voltage Vi, and a DC voltage output after being converted from the input voltage Vi by the AC/DC converter 11 is described as an output voltage Vo. The output voltage Vo needs to be a voltage by which the main body unit 20 can operate. Normally, the magnitude of the output voltage Vo is assumed to be set to a voltage value V1.

The control circuit 12 is an integrated circuit or the like and detects, in a case where power supply from the external power supply P has been cut off, such cutoff of power supply. For example, there are cases where power supply from the external power supply P to the electronic device 1 is unexpectedly cut off due to occurrence of a power failure or pulling out of the power supply cable 30 by a user. The control circuit 12 monitors the input voltage Vi and thereby detects whether power supply from the external power supply P to the power supply unit 10 has been cut off. Details of control executed by the control circuit 12 in the case of detection of cutoff of power supply will be described later.

It is to be noted that the power supply unit 10 includes a capacitor (not illustrated) therein, for current smoothing or the like, and while electric power is being supplied from the external power supply P, electric power is accumulated in the capacitor. In a case where power supply from the external power supply P has been cut off, the power supply unit 10 can supply the electric power accumulated in the capacitor to the main body unit 20. Yet, the electric power accumulated in the capacitor is assumed to be of an amount that is insufficient to allow the main body unit 20 to operate for a long period of time.

The main body unit 20 includes a power supply circuit 21, a system circuit 22, and two resistors R1 and R2.

The power supply circuit 21 is an integrated circuit or the like, and transforms the output voltage Vo output by the power supply unit 10, to a voltage according to specifications of sections included in the main body unit 20, to output the transformed voltage. In the present embodiment, the power supply circuit 21 steps down the output voltage Vo to an operation voltage Vr and outputs the operation voltage Vr to the system circuit 22. Although not illustrated here, the power supply circuit 21 may be one that supplies a voltage necessary for operation of each of the sections of the main body unit 20, other than the system circuit 22. The voltage to be applied to each section may be a voltage of a magnitude that is the same as or different from that of the operation voltage Vr. Each section included in the main body unit 20 including the system circuit 22 operates by the electric power supplied from the power supply circuit 21.

The system circuit 22 is an integrated circuit or the like, and operates by the electric power of the operation voltage Vr supplied from the power supply circuit 21. Especially, in the present embodiment, the system circuit 22 executes predetermined termination processing in a case where power supply from the external power supply P has been cut off. This termination processing may, for example, be processing of writing log data indicating occurrence of cutoff of power supply or processing of shutdown to stop the operation of the units of the device under normal procedures.

The output voltage Vo output by the AC/DC converter 11 is stepped down by the resistors R1 and R2 and then input to the system circuit 22. In the following description, the voltage stepped down by the resistors R1 and R2 and then input to the system circuit 22 is described as a drop voltage Vd. The value of the drop voltage Vd is proportional to the value of the output voltage Vo. In other words, a relation of Vd=r·Vo is established between the output voltage Vo and the drop voltage Vd, with use of a proportional constant r that is defined according to the magnitude of the respective resistance values of the resistor R1 and the resistor R2. The system circuit 22 includes therein an analog-to-digital (AD) converter 22*a*, and measures the magnitude of the drop voltage Vd, on the basis of conversion of the magnitude of the drop voltage Vd (analog value) to a digital value by the AD converter 22*a*. Continuously performing such measurement of the drop voltage Vd, the system circuit 22 detects a change in the output voltage Vo.

In the following description, the operation of the electronic device 1 that is performed when power supply from the external power supply P has been cut off will be explained. In a case of detecting cutoff of power supply from the external power supply P, the control circuit 12 outputs a control command for changing the magnitude of the output voltage Vo to the AC/DC converter 11. Specifically, the control circuit 12 changes the magnitude of the output voltage Vo of the AC/DC converter 11 from the voltage value V1 to a voltage value V2 that is different from the voltage value V1. The voltage value V2 may be a value smaller than the voltage value V1. Yet, the voltage value V2 needs to be a value of a magnitude that allows the power supply circuit 21 to realize such control of outputting the operation voltage Vr on the basis of the output voltage Vo. Thus, the voltage value V2 will be a value that is at least larger than the value of the operation voltage Vr.

The system circuit 22 monitors the value of the drop voltage Vd and thereby detects the change in the output voltage Vo. When the value of the output voltage Vo changes from the voltage value V1 to the voltage value V2, the value of the drop voltage Vd that is proportional to the output voltage Vo changes in a corresponding manner. As a specific example, a case where the voltage value V1=12 V, V2=10 V, and the proportional constant r is 0.2 will be explained. In a case of detecting cutoff of power supply, the control circuit 12 changes the output voltage Vo of the AC/DC converter 11 from 12 V to 10 V. In association with this change, the drop voltage Vd that is to be input to the system circuit 22 changes from 2.4 V (=12 V×0.2) to 2 V (=10 V×0.2). The system circuit 22 detects such a change in the output voltage Vo by comparing the measurement value of the drop voltage Vd with a predetermined threshold (for example, 2.2 V).

When detecting a change in the output voltage Vo from the voltage value V1 to the voltage value V2, the system circuit 22 deems that power supply from the external power supply P to the power supply unit 10 has been cut off. As described above, intentionally changing the value of the output voltage Vo per se by the power supply unit 10 in a case of cutoff of power supply from the external power supply P enables the system circuit 22 to detect cutoff of power supply without establishment of connection between the power supply unit 10 and the system circuit 22 by a control signal line. In a case of detecting cutoff of power supply, the system circuit 22 executes the termination processing described above. Note that the voltage value V2 needs to be a value of a magnitude that is different from that of the voltage value V1 to a degree sufficient enough for the system circuit 22 to identify a change in the step-down voltage Vd without any erroneous detection.

Figure 2:
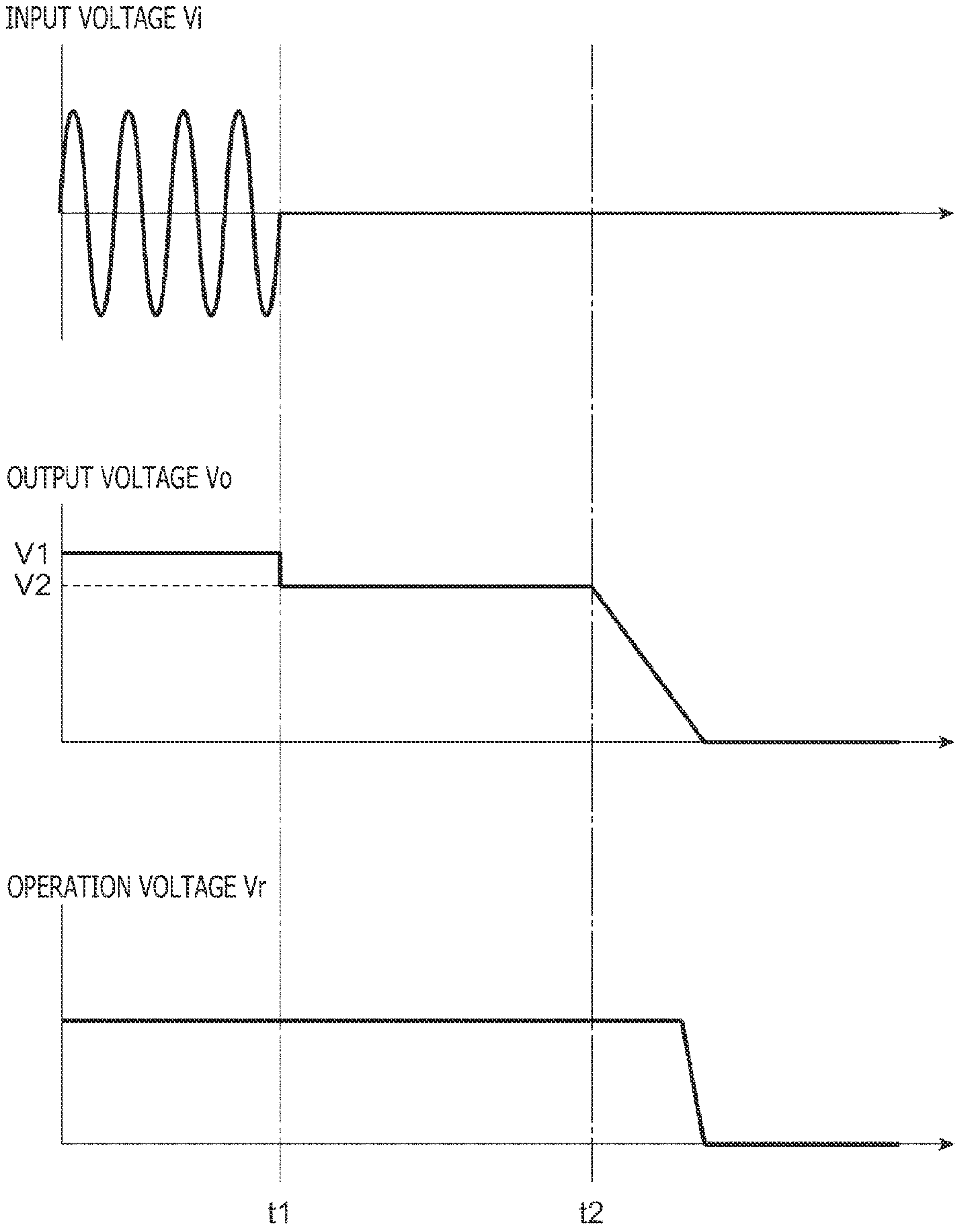
FIG. 2 is a timing diagram for explaining details of control performed by the electronic device according to the embodiment of the present invention.

The flow of the control explained above will be described with use of the timing diagram of FIG. 2. In FIG. 2, the upper part illustrates time variation in the input voltage Vi that is input to the power supply unit 10, the middle part illustrates time variation in the output voltage Vo of the power supply unit 10, and the lower part illustrates time variation in the operation voltage Vr supplied to the system circuit 22 by the power supply circuit 21.

FIG. 2 indicates that power supply from the external power supply P is cut off at time t1. Triggered by this cutoff of power supply, the control circuit 12 changes the output voltage Vo of the AC/DC converter 11 from the voltage value V1 to the voltage value V2. Under normal operation, a certain amount of electric power is accumulated in the power supply unit 10, and thus, even if power supply from the external power supply P has been cut off, the power supply unit 10 can continue supplying the accumulated electric power at the voltage value V2. A change in the voltage value of the output voltage Vo leads to a change in the drop voltage Vd that is to be input to the system circuit 22, and thus, the system circuit 22 that has detected this change starts the termination processing determined in advance.

Even after the output voltage Vo has changed from the voltage value V1 to the voltage value V2, the power supply circuit 21 continues stepping down the output voltage Vo and supplying the electric power of the operation voltage Vr to the system circuit 22, as in the processing prior to the change. The system circuit 22 can execute the termination processing with use of this electric power supplied from the power supply circuit 21.

Thereafter, if the electric power remaining in the power supply unit 10 decreases, the AC/DC converter 11 becomes unable to maintain the output voltage Vo at the voltage value V2, the output voltage Vo drops, and eventually, power supply from the power supply unit 10 to the main body unit 20 is cut off. In FIG. 2, the output voltage Vo is assumed to further drop from the voltage value V2 at a timing of time t2. Thus, the system circuit 22 needs to complete the termination processing during the period from time tl to time t2 (that is, a period during which the power supply unit 10 can continue supplying electric power at the voltage value V2 with use of the electric power remaining therein).

Note that, in a case of detecting a further drop of the output voltage Vo from the voltage value V2 within a predetermined period of time, the system circuit 22 may execute processing different from that to be performed in a case where the output voltage Vo has changed to the voltage value V2. In the present embodiment, the power supply unit 10 is assumed to supply electric power at the voltage value V1 at normal times and at the voltage value V2 in the case of cutoff of power supply from the external power supply P. Here, in a case where the output voltage Vo drops to a value further below the voltage value V2 before a predetermined period of time elapses from the timing at which the output voltage Vo has dropped to the voltage value V2, an unexpected abnormality such as breakdown of the power supply unit 10 is likely to have occurred. As such, in a case of detecting a further drop of the drop voltage Vd below a second threshold that is smaller than r·V2 within a predetermined period of time after detecting that the drop voltage Vd has fallen below a first threshold that is larger than r·V2, the system circuit 22 may execute processing that is different from the termination processing described above, such as processing of writing log data indicating the occurrence of abnormality.

As described above, with the electronic device 1 according to the present embodiment, changing the value of the output voltage Vo by the power supply unit 10 in the case of cutoff of power supply from the external power supply P and detecting the change in the value of the output voltage Vo by the system circuit 22 in the main body unit 20 enable execution of processing according to the cutoff of the power supply without the need for separately performing transmission/reception of control signals between the power supply unit 10 and the system circuit 22.

Note that the embodiment of the present invention is not limited to the one explained above. For example, in the above description, the number of the power supply lines between the power supply unit 10 and the main body unit 20 has been assumed to be one, but the power supply unit 10 may supply electric power to the main body unit 20 via multiple power supply lines. In this case, the power supply unit 10 supplies electric power at voltage values different from each other for the multiple power supply lines. In this example, in a case of detecting cutoff of power supply, the control circuit 12 of the power supply unit 10 changes, to a predetermined value, the magnitude of the output voltage to be output to any one of the multiple power supply lines. By detecting the change in the magnitude of the voltage value output via this one power supply line, the system circuit 22 can execute processing according to the cutoff of power supply. Note that, in this case, the power supply line for which the magnitude of the voltage value is to be changed may be a power supply line different from the power supply line that is used for supplying electric power to the system circuit 22. In this case, even if the magnitude of the voltage value is changed relatively largely, hardly any impact is caused on the power supply to the system circuit 22, making it easier for the system circuit 22 to detect the change in the voltage value. Alternatively, the power supply unit 10 may perform such control of changing the voltage value of the power supply line used for supplying power to the system circuit 22 and, for example, cutting off power supply from other power supply lines. In this case, while the system circuit 22 can execute termination processing with use of the electric power supplied from the power supply line for which the voltage value has been changed, the power supply unit 10 can promptly cut off power supply to a power supply line or lines that have no impact on the termination processing, and thus can continue supplying power to the system circuit 22 for a relatively long period of time.

Further, in the above description, the voltage value V2 of the output voltage Vo that is output by the power supply unit 10 at the time of detection of cutoff of power supply has been assumed to be a value smaller than the voltage value V1 used at normal times, but the voltage value V2 is only required to be a value of a voltage by which the power supply circuit 21 can output the operation voltage Vr to the system circuit 22; the voltage value V2 may be a value larger than the voltage value V1.

Furthermore, in the above description, the power supply unit 10 has been assumed to be incorporated in the electronic device 1, but the power supply unit 10 may be a unit independent of the electronic device 1. Specifically, the power supply unit 10 may be an AC adapter or the like that connects the electronic device 1 and the external power supply P. Also in this case, changing the magnitude of the output voltage Vo in the case of detection of cutoff of power supply from the external power supply P by the power supply unit 10 and detecting the change in the output voltage Vo by the electronic device 1 enable execution of processing according to the cutoff of power supply.

REFERENCE SIGNS LIST

1: Electronic device
10: Power supply unit
11: AC/DC converter
12: Control circuit
20: Main body unit
21: Power supply circuit
22: System circuit
22*a*: AD converter

The invention claimed is:

1. An electronic device comprising:

a main body unit; and a power supply unit electrically connected to the main body unit, wherein the power supply unit includes:

a power converter that converts electric power supplied from an external power supply to a direct current voltage of a first voltage value and outputs the direct current voltage to the main body unit, and a control circuit that directly monitors an input voltage from the external power supply and changes, in response to detecting that the external power supply has been cut off based on the input voltage, a value of the direct current voltage to be output by the power converter to a second voltage value that is different from the first voltage value;

wherein the main body unit executes first termination processing responsive to the value of the direct current voltage changing to the second voltage value; and wherein the main body unit executes second termination processing in a case where the value of the direct current voltage output by the power supply unit is detected to have further dropped before a predetermined period of time has elapsed from a timing at which the value of the direct current voltage has changed to the second voltage value, wherein the second termination processing comprises writing a log data indicating an occurrence of abnormality.

2. The electronic device according to claim 1, wherein the main body unit includes a processing circuit that executes the first termination processing, and the second voltage value is a value larger than a value of an operation voltage of the processing circuit.

3. The electronic device of claim 1, wherein the occurrence of abnormality is associated with a breakdown of the power supply unit.

4. The electronic device of claim 1, wherein the second voltage value is a value less than the first voltage value.

5. The electronic device of claim 1, wherein the power converter comprises an alternating current to direct current power converter.

6. The electronic device of claim 1, wherein the main body unit comprises a processing circuit including an analog-to-digital converter configured to measure a magnitude in change of the direct current voltage.

* * * * *